(12) United States Patent
Inagaki et al.

(10) Patent No.: US 9,812,704 B2
(45) Date of Patent: Nov. 7, 2017

(54) ACTIVE MATERIAL, NONAQUEOUS ELECTROLYTE BATTERY, AND BATTERY PACK

(71) Applicant: KABUSHIKI KAISHA TOSHIBA, Minato-ku (JP)

(72) Inventors: Hiroki Inagaki, Yokohama (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/066,663

(22) Filed: Mar. 10, 2016

(65) Prior Publication Data

US 2016/0268592 A1    Sep. 15, 2016

(30) Foreign Application Priority Data

Mar. 13, 2015 (JP) .................. 2015-050758

(51) Int. Cl.
| | |
|---|---|
| *H01M 4/36* | (2006.01) |
| *H01M 4/485* | (2010.01) |
| *H01M 4/62* | (2006.01) |
| *H01M 10/0525* | (2010.01) |
| *H01M 4/02* | (2006.01) |

(52) U.S. Cl.
CPC ........... *H01M 4/364* (2013.01); *H01M 4/366* (2013.01); *H01M 4/485* (2013.01); *H01M 4/625* (2013.01); *H01M 10/0525* (2013.01); *H01M 2004/027* (2013.01); *H01M 2220/20* (2013.01); *Y02E 60/122* (2013.01); *Y02T 10/7011* (2013.01)

(58) Field of Classification Search
CPC ...... H01M 4/364; H01M 4/485; H01M 4/625; H01M 4/366; H01M 10/0525; H01M 2004/027; H01M 2220/20
See application file for complete search history.

(56) References Cited

U.S. PATENT DOCUMENTS

| | | | |
|---|---|---|---|
| 2008/0261113 A1 | 10/2008 | Huang et al. | |
| 2009/0042095 A1 | 2/2009 | Inagaki et al. | |
| 2012/0328930 A1* | 12/2012 | Inagaki .................. | H01M 4/485 429/163 |

FOREIGN PATENT DOCUMENTS

| | | |
|---|---|---|
| EP | 2 437 335 A1 | 4/2012 |
| JP | 2001-143702 A | 5/2001 |
| JP | 2007-234233 A | 9/2007 |
| JP | 4237659 B2 | 3/2009 |
| JP | 2010-510631 A | 4/2010 |
| JP | 2014-103032 A | 6/2014 |
| WO | WO 2012/002364 A1 | 1/2012 |

(Continued)

OTHER PUBLICATIONS

Extended European Search Report dated Sep. 15, 2016 in European Patent Application No. 16158681.3.

(Continued)

*Primary Examiner* — Jane Rhee
(74) *Attorney, Agent, or Firm* — Oblon, McClelland, Maier & Neustadt, L.L.P.

(57) ABSTRACT

According to one embodiment, an active material is provided. This active material includes a mixed phase of a phase of titanium-including composite oxide and a phase of titanium oxide. The titanium-including composite oxide has a crystal structure belonging to a space group Cmca or a space group Fmmm.

13 Claims, 5 Drawing Sheets

(56) References Cited

FOREIGN PATENT DOCUMENTS

WO     WO 2012/002365 A1     1/2012
WO     WO 2016/084200 A1     6/2016

OTHER PUBLICATIONS

I. Koseva, et al, "A New Strontium Lithium Titanium Oxide, $SrLi_2Ti_6O_{14}$: Crystal Growth and Structure Determination", Zeitschrift Fuer Naturforschung B (Chemical Sciences), XP-002760853, vol. B57, No. 5, May 2002, pp. 512-518.

* cited by examiner

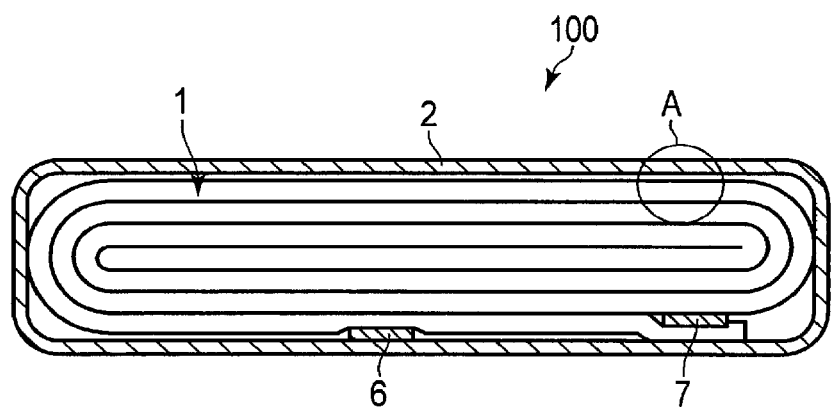
F I G. 1
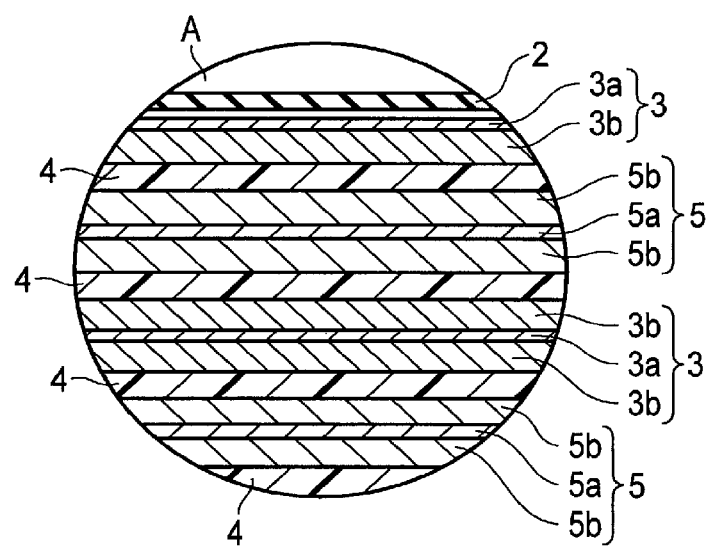
F I G. 2

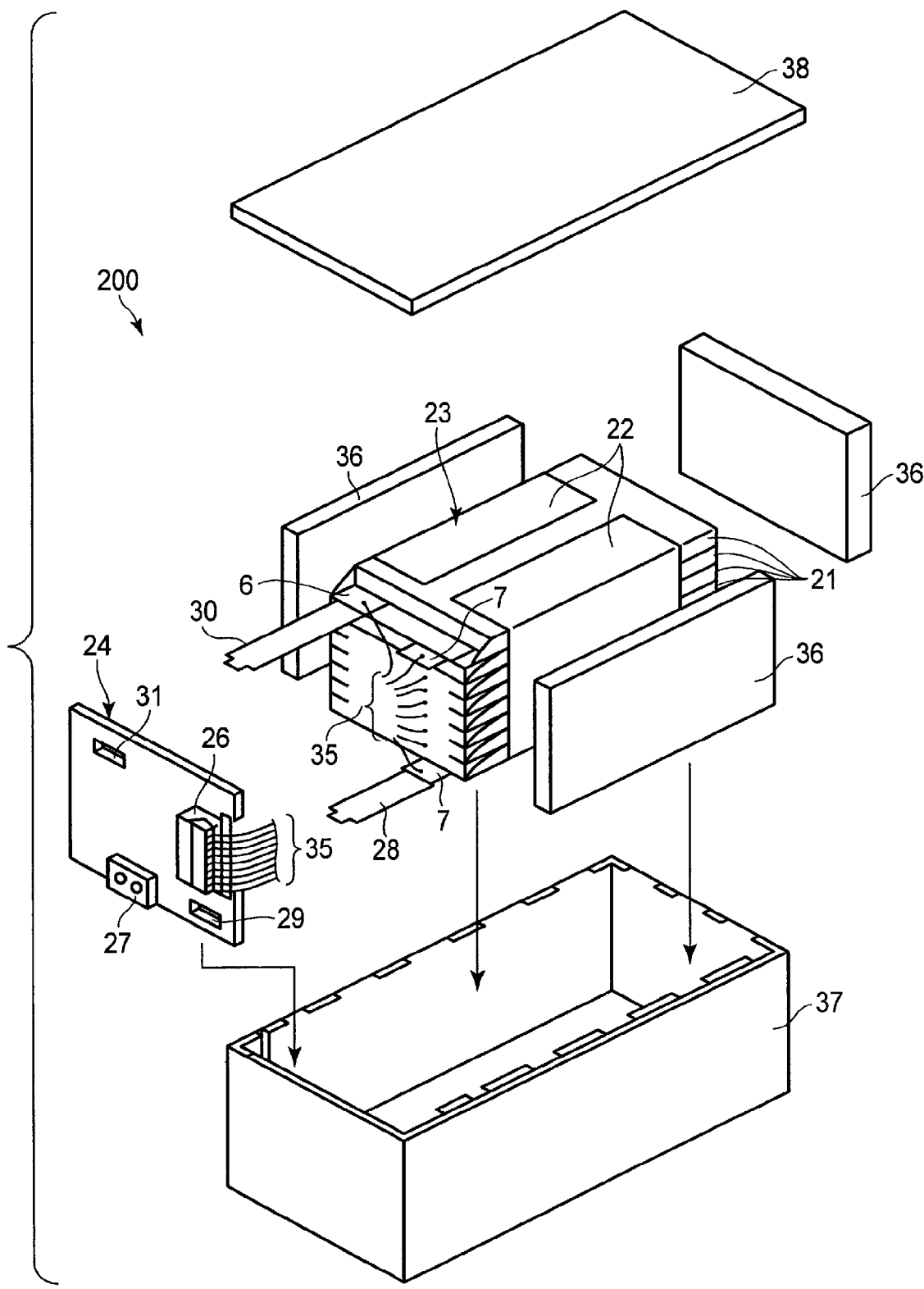
F I G. 4

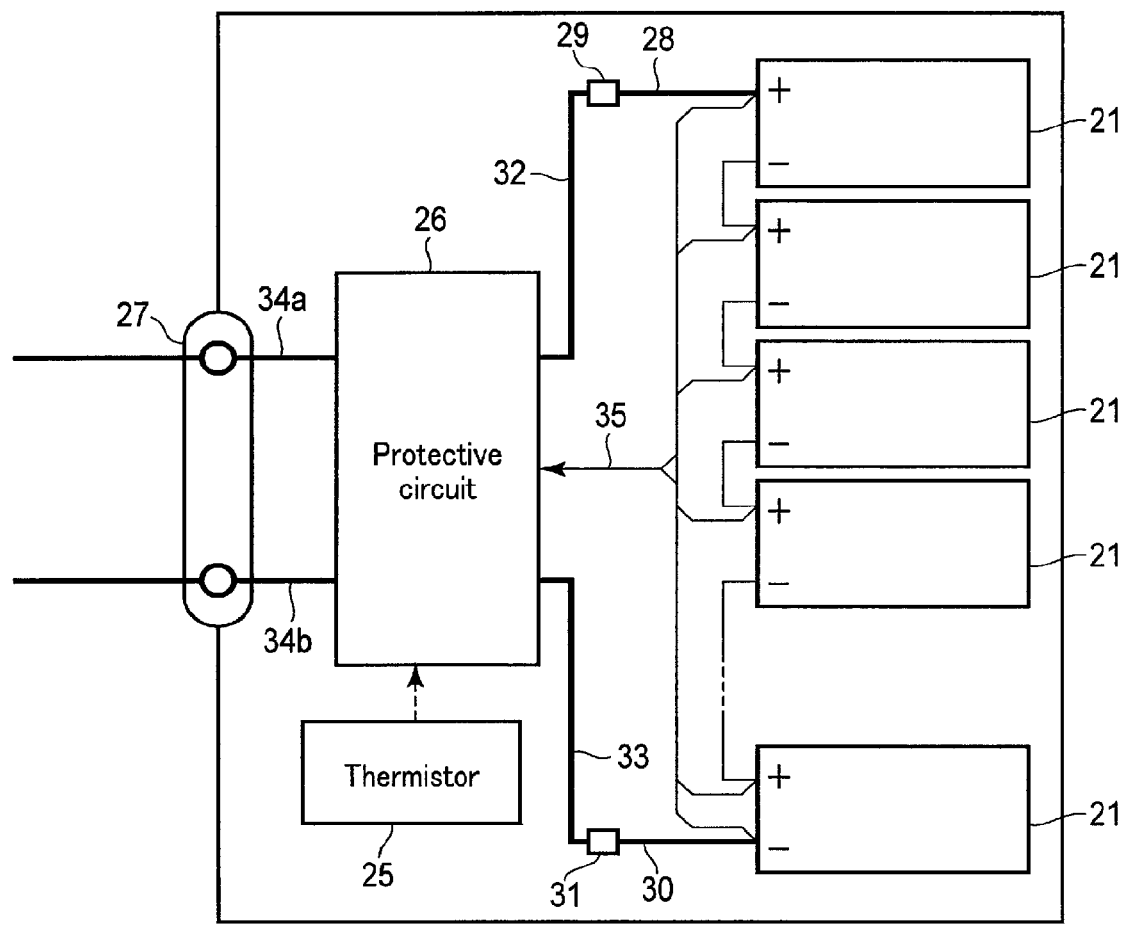
F I G. 5
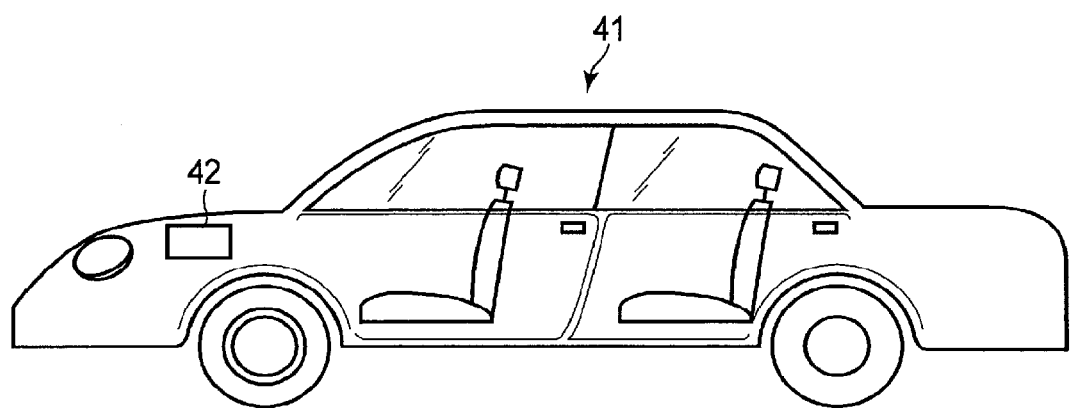
F I G. 6

ACTIVE MATERIAL, NONAQUEOUS ELECTROLYTE BATTERY, AND BATTERY PACK

CROSS-REFERENCE TO RELATED APPLICATION

This application is based upon and claims the benefit of priority from Japanese Patent Application No. 2015-050758, filed Mar. 13, 2015; the entire contents of which are incorporated herein by reference.

FIELD

Embodiments of the present invention relate to an active material, a nonaqueous electrolyte battery, a battery module, a battery pack and a vehicle.

BACKGROUND

In recent years, rapid technical development in the electronics field has been promoting the reduction of the size and weight of electronic appliances. As a result, portable and cordless electronic appliances are increasing, and therefore there also is high demand for the reduction of the size and weight of the secondary power sources driving them. In order to satisfy these demands, lithium secondary batteries having a high energy density are being developed. In addition, ultrathin and lightweight secondary batteries using aluminum laminate film as the container member are also being developed and commercialized, recently.

In the secondary battery using the aluminum laminate container member, the battery thickness changes due to the volume expansion and contraction of the electrodes associated with charge and discharge. There is a problem in that as a result of this, the battery becomes twisted, and the distance between the electrodes increases thereby increasing battery resistance, resulting in the deterioration in battery characteristics.

A battery that can avoid these problems has been developed, in which lithium titanate is used as the material type for the negative electrode active material. Lithium titanate barely has any volume change associated with charge and discharge, and as a result, change in the battery thickness is extremely small. The above-described problems are solved by using this compound as the negative electrode active material.

BRIEF DESCRIPTION OF THE DRAWINGS

FIG. 1 is a schematic cross-sectional view of an example of a nonaqueous electrolyte battery according to a second embodiment;

FIG. 2 is an enlarged cross-sectional view of section A of the nonaqueous electrolyte battery of FIG. 1;

FIG. 4 is an exploded perspective view of an example of a battery pack according to a fourth embodiment;

FIG. 5 is a block diagram of an electric circuit of the battery pack of FIG. 4;

FIG. 6 is a schematic cross-sectional view of an example of a vehicle according to a fifth embodiment.

DETAILED DESCRIPTION

Figure 3:
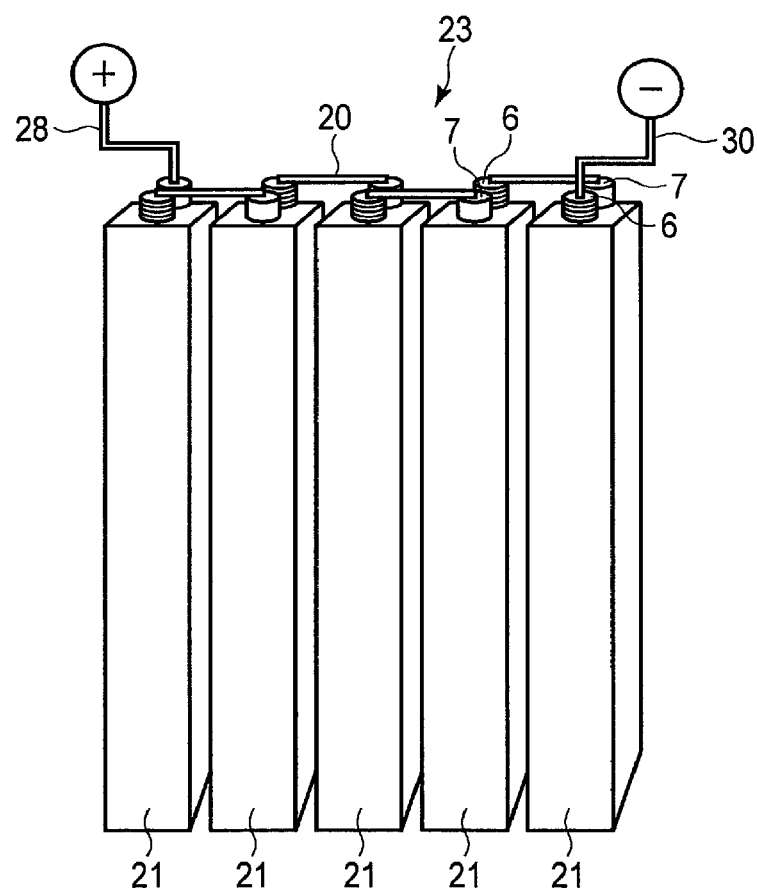
FIG. 3 is a schematic perspective view of an example of a battery module according to a third embodiment.

According to a first embodiment, a battery active material is provided. This battery active material includes a mixed phase of a phase of titanium-including composite oxide and a phase of titanium oxide. The titanium-including composite oxide has a crystal structure belonging to a space group Cmca or a space group Fmmm.

According to a second embodiment, a nonaqueous electrolyte battery is provided. The nonaqueous electrolyte battery includes a positive electrode, a negative electrode, and a nonaqueous electrolyte. The negative electrode includes a negative electrode active material. The negative electrode active material includes the battery active material according to the first embodiment.

According to a third embodiment, a battery module is provided. This battery module includes plural of the nonaqueous electrolyte batteries according to the second embodiment. The plural nonaqueous electrolyte batteries are electrically connected in series and/or in parallel.

According to a fourth embodiment, a battery pack is provided. This battery pack includes the nonaqueous electrolyte battery according to the second embodiment.

According to a fifth embodiment, a vehicle including the battery pack according to the fourth embodiment is provided. The battery pack is disposed in an engine room of the vehicle.

The embodiments will be explained below with reference to the drawings. In this case, structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, these structural designs may be appropriately changed taking the following explanations and known technologies into consideration.

First Embodiment

According to the first embodiment, a battery active material is provided. This battery active material includes a mixed phase including a phase of titanium-including composite oxide and a phase of titanium oxide. The titanium-including composite oxide has a crystal structure belonging to a space group Cmca or a space group Fmmm.

In lithium titanate, inserting and extracting reaction of Li proceeds at about 1.55 V (vs. Li/Li$^+$). Therefore, for example, a nonaqueous electrolyte battery including lithium titanate as the negative electrode and LiMn$_2$O$_4$ as the positive electrode has an average voltage of about 2.5 V. This voltage is lower than 3.9 V, which is the average voltage of widely commercialized lithium ion secondary batteries including a carbon negative electrode and a LiMn$_2$O$_4$ positive electrode. Consequently, when a nonaqueous electrolyte battery, which includes a lithium titanate-including negative electrode and a LiMn$_2$O$_4$-including positive electrode, is used to compose a battery module or a battery pack exhibiting the same average voltage as a secondary battery, which includes a carbon negative electrode and an LiMn$_2$O$_4$ positive electrode, the number of serial connection (the number of cells) must be greater than that for the secondary battery that includes a carbon negative electrode and an LiMn$_2$O$_4$ positive electrode.

In view of these problems, in order to increase the cell voltage, the inventors searched for a battery active material which can realize a nonaqueous electrolyte battery in which inserting and extracting reaction of Li proceeds at a lower potential than lithium titanate, and yet provides input and output characteristics and life characteristics equivalent to those provided by lithium titanate.

As a candidate, a titanium-including composite oxide having a crystal structure belonging to the space group Cmca or space group Fmmm was found. In this titanium-including composite oxide, the Li inserting and extracting reaction proceeds at a potential of around 1.2 V to 1.5 V (vs. Li/Li$^+$). Therefore, a nonaqueous electrolyte battery using the negative electrode including the titanium-including composite oxide exhibits a higher battery voltage than a nonaqueous electrolyte battery including lithium titanate.

On the other hand, dedicated research showed that the above-described titanium-including composite oxide has poor electron conductivity. Therefore, the nonaqueous electrolyte battery including the negative electrode including the above-described titanium-composite oxide may have poor input and output characteristics such as large current characteristics, and may exhibit poor life characteristics.

In view of the above-described problems, the inventors carried out dedicated research and have found that it is effective to disperse titanium oxide within the titanium-including composite oxide, that is, to form a mixed phase state of a phase of titanium oxide and a phase of titanium-including composite oxide having a crystal structure belonging to the space group Cmca or space group Fmmm.

Titanium oxide is a good conductor in a charged state, that is, a state where Li is inserted. The reason for this is that the valence of titanium Ti changes from tetravalent (valence of 4) to trivalent (valence of 3), when Li is inserted into titanium oxide. Furthermore, since the irreversible capacity of titanium oxide is large, even if Li is extracted for discharge, trivalent titanium can be included, and can therefore maintain high electron conductivity. The inventors have found that by making use of this phenomenon, the above-described problems can be solved by forming a mixed phase including a phase of titanium oxide and a phase of titanium-including composite oxide having a crystal structure belonging to the space group Cmca or space group Fmmm, which is an insulator.

This effect cannot be expressed by just simply mixing powders of titanium-including composite oxide and titanium oxide, but can be expressed by forming a mixed phase state of titanium-including composite oxide phase and titanium oxide phase. Because of this, the battery active material according to the first embodiment exhibits markedly improved electron conductivity after incorporation into a battery and initial charge. In this manner, the battery active material according to the first embodiment can realize a nonaqueous electrolyte battery which has both excellent large current characteristics and excellent life characteristics.

The titanium-including composite oxide may only include a crystal structure belonging to one of the space groups, Cmca or Fmmm. Alternatively, the titanium-including composite oxide may include both a crystal structure belonging to the space group Cmca and a crystal structure belonging to the space group Fmmm. Furthermore, the titanium-including composite oxide may additionally include crystal structures belonging to space groups other than Cmca and Fmmm.

Examples of titanium-including composite oxide having the crystal structure belonging to space group Cmca include a titanium-including composite oxide represented by the general formula $Li_{(2+x)}MTi_6O_{14}$. In this formula, M is at least one selected from Sr and Ba, x is within the range of $0 \leq x \leq 6$, and changes according to state of charge. The element M may be used singly, or plural kinds of elements may be used. On the other hand, examples of titanium-including composite oxide having a crystal structure belonging to space group Fmmm include a titanium-including composite oxide represented by the general formula $Li_{(2+y)}Na_2Ti_6O_{14}$. In the formula, y is with in the range of $0 \leq y \leq 6$, and changes according to state of charge.

Examples of titanium oxide include anatase type titanium dioxide having a crystal structure belonging to space group I4$_1$/amd, rutile type titanium dioxide having a crystal structure belonging to space group P4$_2$/mnm, brookite type titanium dioxide having a crystal structure belonging to space group Pbca, and non-stoichiometric titanium oxide. In particular, anatase type titanium dioxide having high Li insertion ability and a large irreversible capacity is preferred.

The above-described mixed phase state can be examined by identifying the composition phase by wide-angle X-ray diffraction, and analyzing it by, for example, element mapping or lattice analysis using SEM-EDX or TEM-EDX.

The mixing ratio between the titanium-including composite oxide phase and titanium oxide phase can be examined by calculating the intensity ratio between the main peaks of the titanium-including composite oxide phase and titanium oxide phase, by wide-angle X-ray diffraction. In the battery active material according to the first embodiment, the intensity ratio Z of the main peak intensity Y of titanium oxide to the main peak intensity X of titanium-including composite oxide (Z=Y/X) is preferably from 0.01 to 1.3, as measured by wide-angle X-ray diffraction. When the intensity ratio Z is within this range, the battery active material can have excellent electron conductivity, and thus sufficient input and output performance can be obtained. In addition, when the intensity ratio Z is within this range, the battery active material has a sufficient electricity amount and initial charging and discharging efficiency, and thus can realize a nonaqueous electrolyte battery exhibiting sufficient energy density. The intensity ratio Z is more preferably from 0.05 to 0.2.

The battery active material according to the first embodiment may be, for example, particulate. The battery active material according to the first embodiment may be, for example, primary particles, or secondary particles formed by agglomeration of primary particles.

The battery active material according to the first embodiment is preferably in the form of primary particles, from the viewpoint of life characteristics. When the battery active material is in the form of secondary particles, the secondary particles may break apart due to volume change of the active material, which may result in decrease of life characteristics.

When the battery active material includes secondary particles, the average secondary particle diameter is preferably from 1 μm to 100 μm. When the average particle size of the secondary particles is within this range, handling in industrial applications is easy, and the mass and thickness of the coating during electrode manufacture can be made uniform. Furthermore, decrease of the surface smoothness of the electrodes can be prevented. The average particle size of the secondary particles is more preferably from 3 μm to 30 μm.

The secondary particles included in the battery active material can be examined by, for example, observation using a scanning electron microscope (SEM).

The primary particles included in the secondary particles preferably have an average primary particle size of 1 nm to 10 μm. When the average primary particle size is within this range, handling in industrial applications is easy, and diffusion of lithium ions within the titanium-including composite oxide solids is accelerated. The average primary particle size is more preferably from 0.30 nm to 0.98 μm.

The primary particles are preferably isotropic. Herein, isotropic particles mean particles having an aspect ratio of 3 or less. Whether the primary particles are isotropic particles can be examined by observation using a scanning electron microscope (SEM).

The active material preferably has a specific surface area of from 3 $m^2/g$ to 50 $m^2/g$ as measured by the BET method. When the specific surface area is 3 $m^2/g$ or more, inserting and extracting sites of lithium ions are sufficiently secured. When the specific surface area is 50 $m^2/g$ or less, the active material is easily handled in industrial applications.

The battery active material according to the first embodiment preferably has a carbon-including layer formed on at least a portion of the particle surface. When the battery active material according to the first embodiment further includes a carbon-including layer, it exhibits more excellent electron conductivity. The carbon amount is preferably from 0.1% by mass to 10% by mass relative to the mass of the active material. When the carbon amount is within this range, an effect of improving electronic conduction can be obtained, while sufficiently securing capacity. The carbon amount is more preferably from 1% by mass to 3% by mass relative to the mass of the active material. The carbon amount can be quantified by, for example, high-frequency heating-infrared-absorbing analysis method.

The battery active material according to the first embodiment may be subjected to substitution with a dopant for the purpose of performance improvement. Examples of the dopant used for substitution include, from the viewpoints of rate characteristics and life performance improvement, at least one element selected from Zr, Mo, W, V, Nb, Ta, P, Y, Al, Fe, and B. These elements may be used singly, or plural kinds of elements may be used. The battery active material according to the first embodiment may include 0.03 to 8.33 atom % of these elements. The included amount of the above-described element can be measured by inductively coupled plasma (ICP) emission spectrometry.

The battery active material according to the first embodiment may further include, in addition to the above-described additive element and carbon, unavoidable impurities during production in an amount of 1000 ppm by mass or less.

The battery active material according to the first embodiment explained above may be manufactured by, for example, as follows.

First, as the Li source, a lithium salt such as lithium hydroxide, lithium oxide, or lithium carbonate is prepared. When a titanium-including composite oxide including sodium is synthesized, as the Na source, a sodium salt such as sodium hydroxide, sodium oxide, or sodium carbonate is prepared. Subsequently, the prepared Li source, and Na source when necessary, is dissolved in pure water in specified amounts.

Next, when a titanium-including composite oxide including sodium is synthesized, titanium oxide is added into the thus obtained solution such that the atomic ratio between lithium, titanium, and sodium would be of specified ratio. For example, when a titanium-including composite oxide having a composition formula $Li_2Na_2Ti_6O_{14}$ is synthesized, lithium, sodium, titanium are mixed such that the atomic ratio would be 2:2:6.

On the other hand, when a titanium-including composite oxide including barium and/or strontium is synthesized, titanium oxide and an oxide or carbonate of strontium and/or barium are added to a solution obtained by dissolving an Li source in pure water, such that the atomic ratio between lithium, titanium, and strontium and/or barium would be of a specified ratio.

Subsequently, the solution obtained after adding titanium oxide as described above is dried while stirring, thereby obtaining a calcination precursor. The drying method may be spray drying, granulation drying, freeze-drying, or a combination of these. The calcination precursor thus obtained is calcined to obtain a titanium-including composite oxide. Calcination may be carried out in air, or in an oxygen atmosphere or inert atmosphere using argon and the like.

In the above-described process, the powders of the Li source, and Na source used when necessary, may be simply mixed without dissolving in pure water; however, in order to more uniformly mix the raw materials and suppress the formation of impurity phase, the above-described process is preferably carried out.

Calcining of the calcination precursor or mixed raw materials may be performed at 680° C. to 1100° C. for about 30 minutes to 24 hours, preferably at 720° C. to 950° C. for 1 hour to 6 hours.

If the temperature is below 680° C., the raw materials react insufficiently, and the electric capacity decreases due to the increase of impurity phase and decrease of crystallinity. If the temperature is higher than 1100° C., the crystallite diameter grows excessively due to progress of sintering, which results in decrease of the large current performance.

By subjecting the titanium-including composite oxide obtained by the above-described calcining to pulverization and re-calcining under conditions described below, the pore capacity and average pore diameter of the primary particles can be controlled. Examples of the pulverization method include use of a mortar, ball mill, sand mill, vibrating ball mill, planetary ball mill, jet mill, counter jet mill, swirling air flow type jet mill, and sieve. When pulverizing, wet pulverization in the presence of a known liquid pulverization aid such as water, ethanol, ethylene glycol, benzene, or hexane may be used. Use of pulverization aid is effective for improvement of pulverization efficiency and increase of the amount of fine powder formed. The more preferred method is pulverizing with a ball mill using zirconia balls as the medium, and is preferably a wet pulverization using a liquid pulverization aid. Furthermore, an organic substance such as polyol for improving the pulverization efficiency may be added as a pulverization aid. The kind of polyol is not particularly limited, and, for example, pentaerythritol, triethylolethane, and trimethylolpropane may be used alone or in combination.

Re-calcining may be carried out in air. Alternatively, re-calcining may be carried out in an oxygen atmosphere or an inert atmosphere using, for example, argon. In addition, re-calcining may be carried out at 250° C. to 900° C. over a span of about 1 minute to 10 hours. If the temperature is 900° C. or higher, calcination of the pulverized powder proceeds, so that pores become plugged even with heating for a short time, and the pore size distribution described in the present embodiment is difficult to achieve. If the temperature is below 250° C., impurities (organic substances) that adhere during wet pulverization cannot be removed, and the battery performance decreases. Re-calcining is preferably carried out at 400° C. to 700° C. for 10 minutes to 3 hours.

The pH value of the titanium-including composite oxide particles is preferably from 10 to 11.2. In the calcining process of the titanium-including composite oxide, formation of byproducts such as lithium carbonate, sodium carbonate, lithium hydroxide, and sodium hydroxide may be caused due to unreacted Li component and/or Na component which are not incorporated into the titanium-including composite oxide. The battery properties, in particular, high temperature cycling characteristics and output properties can be improved by reducing the unreacted Li component and/or Na component, and making the pH value of the titanium-including composite oxide particles smaller than 11.2.

The reason for this is that if the unreacted Li component and/or Na component such as lithium carbonate, sodium carbonate, lithium hydroxide, or sodium hydroxide remains on the surface of the active material particles, these unreacted Li component and/or Na component remaining on the surface of active material particles react with the nonaqueous electrolyte to generate carbon dioxide and hydrocarbon gas, and also, an organic film exhibiting electric resistance forms on the surface of the active material particles by these side reactions.

However, if the titanium-including oxide particles are mechanically pulverized under the above-described conditions, unreacted Li and/or Na component become exposed on the surface, and so, there is tendency for the pH value to exceed 11.2, resulting in decrease of battery performance. For this reason, the re-calcining process is carried out after the pulverization process. By performing the re-calcining process, unreacted Li and/or Na component exposed on the surface are taken into the active material, and unreacted Li and/or Na component remaining on the particle surface can be reduced. In other words, by performing the re-calcining process after pulverization, the pH value can be controlled to be 11.2 or lower.

At the step of reacting the Li source and Na source such as lithium hydroxide, sodium hydroxide, lithium carbonate, and sodium carbonate with titanium oxide (e.g., anatase type $TiO_2$ or rutile type $TiO_2$), which are raw materials for the titanium-including oxide, it is possible to reduce side product formation of excessive Li salt and/or Na salt such as lithium carbonate and sodium carbonate by decreasing the proportion of the Li source and/or Na source. However, if the proportion of the Li source and/or Na source is decreased, the proportion of lithium or sodium in the obtained active material decreases, and as a result, the electric capacity of the titanium-including oxide decreases. Therefore, in order to maintain a high electric capacity, the pH value of the obtained active material is desirably made to be 10 or more, without decreasing the amounts of the Li source and Na source as raw materials.

In consideration of maintaining the electric capacity and reducing side reactions, the pH value is more preferably from 10.3 to 11.

The pH value of titanium-including oxide particles can be measured by the following procedure. 1 g of the titanium-including oxide particles is dispersed in 50 mL of pure water (25° C.), stirred for about 10 minutes, and then the active material particles are filtered to obtain a filtrate. The pH value of the filtrate is used as the pH value of the titanium-including oxide particles.

[Method for Examining the Battery Active Material According to the First Embodiment]

Subsequently, with regard to the battery active material according to the first embodiment, the method for examining the crystal structure, method for examining the mixed phase, method for examining the amount of included elements by ICP emission spectrometry, method of measuring the carbon amount, method of measuring the average particle size of secondary particles, method for examining the average particle size of primary particles, and method of measuring the specific surface area are described.

When the battery active material according to the first embodiment is incorporated into a battery, it can be taken out, for example, by the following procedure. First, the battery is discharged. For example, the battery may be discharged to the rated final voltage at a current of 0.1 C in a 25° C. environment, to bring the battery into a discharged state. Next, the discharged battery is disassembled, and an electrode (for example, a negative electrode) is taken out. The taken out electrode is washed with, for example, methylethyl carbonate. The washed electrode is placed in water, and the electrode layer is deactivated in water. The battery active material can be extracted from the deactivated electrode using, for example, a centrifugation apparatus.

The extraction treatment is carried out by, for example, removing the binder component by washing with N-methyl-2-pyrrolidone in the case that polyvinylidene fluoride is used as the binder, and then removing the conductive agent using a mesh having an adequate aperture. If these components slightly remain, they may be removed by heat treatment (for example, at 250° C. for 30 minutes) in atmospheric air.

(Method for Examining Crystal Structure of Active Material)

First, the method for examining the crystal structure of the active material is described.

The crystal structure of the active material can be examined by wide-angle X-ray diffraction (XRD).

The wide-angle X-ray diffraction of the active material is carried out as follows. First, the target sample is pulverized to an average particle size of about 5 µm. The average particle size can be determined by, for example laser diffraction, as described above. The pulverized sample is loaded into a holder portion having a depth of 0.2 mm formed on a glass sample plate. At this time, the holder portion should be sufficiently filled with the sample. In addition, cracks or voids caused by insufficient loading of the sample should be avoided. Subsequently, the sample is flattened by external pressing using another glass plate. Formation of bulges and depressions on the reference surface of the holder caused by excess or insufficient loading should be avoided. Subsequently, the glass plate loaded with the sample is placed in a wide-angle X-ray diffraction apparatus, and the diffraction pattern is obtained using a Cu-Kα line.

When the sample is highly oriented, depending on the manner that the sample is loaded, the peak position may be shifted, or the intensity ratio may be changed. Such sample is measured in the form of a pellet. The pellet may be, for example, a pressed powder having a diameter of 10 mm and a thickness of 2 mm. This pressed powder can be fabricated by applying a pressure of about 250 MPa to the sample for 15 minutes. The obtained pellet is placed in the X-ray diffraction apparatus, and its surface is measured. By measuring by such a method, differences in measured results due to different operators are excluded, and reproducibility can be made high.

When wide-angle X-ray diffraction is performed on the active material included in an electrode, it can be performed for example, as follows.

First, in order to grasp the crystal condition of the active material, the active material is put in a state in which lithium ions are completely extracted. For example, when used as a negative electrode, the battery is completely discharged. However, residual lithium ions may remain even in a discharged state. Next, the battery is dismantled in a glove box filled with argon, and washed with an adequate solvent. For example, using ethyl methyl carbonate is appropriate. The washed electrode may be cut out to have an area equivalent to the holder area of the wide angle X-ray diffraction apparatus, and directly attached to a glass holder, then measured. At this time, XRD is measured in advance according to the type of metal foil of the electrode current collector, and the position of the peak originating from the current collector is noted. In addition, the presence or absence of peaks of the mixed agents such as a conductive agent and binder is taken note of in advance. When the peaks of the current collector and active material are overlapped, measurement is performed preferably with the active material stripped off from the current collector. The purpose for this is to separate the overlapped peaks when quantitatively measuring the peak intensity. As a matter of course, this operation may be omitted if they are taken note of in advance. The electrode may be physically peeled off, but is easily peeled off by sonication in a solvent. By measuring the electrode thus recovered, wide-angle X-ray diffraction of the active material can be performed.

The thus obtained result of wide-angle X-ray diffraction is analyzed by the Rietveld method. In the Rietveld method, a diffraction pattern calculated from a crystal structural model presumed in advance is subjected to full fitting against measured values, therefore parameters relating to crystal structure (for example, lattice constant, atomic coordinate, and population) can be made precise, and thus, characteristics of the crystal structure and the positions (sites) of additive elements in the measured active material can be investigated.

In addition, the mixing ratio between the titanium-including composite oxide phase and titanium oxide phase can be examined by calculating the peak intensity ratio between the main peak of the titanium-including composite oxide phase and the main peak of the titanium oxide phase by wide-angle X-ray diffraction.

For example, the XRD chart of $Li_2Na_2Ti_6O_{14}$ has main peaks appearing in the vicinity of 18° or 45°. The XRD chart of $Li_2SrTi_6O_{14}$ has a main peak appearing in the vicinity of 45°. The XRD chart of $Li_2BaTi_6O_{14}$ has a main peak appearing in the vicinity of 23.5° or 45°. On the other hand, the XRD chart of anatase type titanium dioxide has a main peak appearing in the vicinity of 25°. In addition, the XRD chart of rutile type titanium dioxide has a main peak appearing in the vicinity of 27°.

(Method for Examining Mixed Phase Included in the Active Material)

The battery active material according to the first embodiment including a mixed phase including a titanium composite oxide phase and a titanium oxide phase can be definitely differentiated from a mixed powder prepared by simply mixing titanium composite oxide particles and titanium oxide particles, by the following procedures.

In the mixed phase of a titanium composite oxide phase and a titanium oxide phase included in the battery active material according to the first embodiment, both phases are firmly bonded together by chemical bonding, and therefore cannot be broken apart by sonication or the like. For example, the battery active material according to the first embodiment is dispersed in a solvent such as N-methylpyrrolidone, and subjected to sonication for about 5 minutes. When the battery active material is recovered from the dispersion thus treated and analyzed, the recovered battery active material is found to have sustained a mixed phase state of a titanium composite oxide phase and a titanium oxide phase.

On the other hand, a battery active material including a mixed powder of titanium composite oxide particles and titanium oxide particles can be broken apart, for example, by subjecting to sonication. For example, a battery active material including a mixed powder of titanium composite oxide particles and titanium oxide particles is dispersed in a solvent such as N-methylpyrrolidone, and subjected to sonication for about 5 minutes. When the battery active material is recovered from the dispersion thus treated and analyzed, the recovered battery active material is found to include titanium composite oxide particles and titanium oxide particles which are separated from each other.

(Method of Measuring the Amount of Included Elements by ICP Emission Spectrometry)

The measurement of the amount of included elements by ICP emission spectrometry can be carried out, for example, by the following method. The active material extracted by the above-described procedure is measured and placed in a container, and subjected to acid fusion or alkali fusion, thereby obtaining a measurement solution. By performing ICP emission spectrometry on this measurement solution using a measuring apparatus (for example, SPS-1500V manufactured by SII NanoTechnology Inc.), the amount of elements included in the active material can be measured. Using such an emission spectrometer allows the amount of added elements that are included in the active material to be measured.

On the other hand, when another active material is included in the electrode, the amount of elements included can be determined as follows. The negative electrode active material taken out from the electrode is subjected to TEM-EDX, and the crystal structure of each particle is specified by the selected area diffraction method. Particles having a diffraction pattern assigned to the general formula $Li_{(2+x)}Na_2Ti_6O_{14}$ are selected, and the synthetically included amount of elements can be measured by EDX analysis.

(Method for Measuring Carbon Amount)

The amount of carbon included in the active material can be measured by, for example, subjecting the active material taken out as described above to drying at 150° C. for 12 hours, then weighing it out into a container, and measuring using a measuring apparatus (for example, CS-444LS manufactured by LECO Corporation).

When another active material is included in the electrode, measurement can be performed as follows. The active material taken out from the electrode is subjected to TEM-EDX, and the crystal structure of each particle is specified by the selected area diffraction method. The particles having a diffraction pattern assigned to titanium-including oxide are selected, and the amount of carbon included is measured. Further, at this time, the area where carbon is present can be known by acquiring the carbon mapping by EDX.

(Method for Measuring Average Particle Size of Secondary Particles)

The method for measuring the average particle size of the secondary particles is as follows. The measuring apparatus is a laser diffraction distribution analyzer (SALD-300 manufactured by Shimadzu Corporation). First, about 0.1 g of the sample, a surfactant, and 1 to 2 mL of distilled water are put in a beaker, then thoroughly stirred, and the mixture is poured into a stirring water tank, thereby preparing a sample solution therein. Using the sample solution, the luminous intensity distribution is measured 64 times at intervals of 2 seconds, and the particle size distribution data is analyzed.

(Method for Examining Average Diameter of Primary Particles)

The average primary particle size can be examined by observation using a scanning electron microscope (SEM). The average particle size of ten typical particles extracted from a typical visual field is obtained, and the average primary particle size is determined.

(Method for Measuring Specific Surface Area)

The specific surface area may be measured by adsorbing molecules having a known adsorption occupied area onto the surface of powder particles at the temperature of liquid nitrogen, and determining the specific surface area of the sample from the adsorbed amount. The most frequently used is the BET method based on low temperature low humidity physical adsorption of an inert gas, and is the most famous theory as a method for calculating the specific surface area, where the Langmuir theory which is a monolayer molecular adsorption theory, has been extended to multilayer adsorption. The specific surface area obtained by this method is referred to as BET specific surface area.

The battery active material according to the first embodiment explained above can be used in either a negative electrode or a positive electrode of a nonaqueous electrolyte battery. In addition, irrespective of whether it is used in a negative electrode or a positive electrode, it can realize a nonaqueous electrolyte battery which can exhibit excellent input and output characteristics and life characteristics.

When the battery active material according to the first embodiment is used in a positive electrode, the active material of the negative electrode as a counter electrode may be, for example, metal lithium, lithium alloy, or a carbon material such as graphite or coke.

When the battery active material according to the first embodiment is used as a negative electrode active material in the negative electrode, it may be used alone, or in combination with another active material. Examples of the other active material include a lithium titanium composite oxide having a spinel structure (e.g., $Li_4Ti_5O_{12}$), a niobium-including oxide (e.g., $Nb_2O_5$ or $TiNb_2O_7$), and an iron-complex sulfide (e.g., $FeS$ or $FeS_2$).

Similarly, when the electrode active material according to the first embodiment is used as the positive electrode active material in the positive electrode, it may be used alone, or in combination with another active material. Examples of the other active material include a lithium titanium composite oxide having a spinel type structure (e.g., $Li_4Ti_5O_{12}$), a niobium-including oxide (e.g., $Nb_2O_5$ or $TiNb_2O_7$), and an iron-complex sulfide (e.g., $FeS$ or $FeS_2$).

According to the first embodiment explained above, a battery active material is provided. This battery active material includes a mixed phase of a titanium oxide phase and a phase of titanium-including composite oxide having a crystal structure belonging to the space group Cmca or space group Fmmm. As a result, the battery active material according to the first embodiment can realize a nonaqueous electrolyte battery exhibiting excellent input and output characteristics and life characteristics.

Second Embodiment

According to the second embodiment, a nonaqueous electrolyte battery is provided. The nonaqueous electrolyte battery includes a positive electrode, a negative electrode, and a nonaqueous electrolyte. The negative electrode includes a negative electrode active material. The negative electrode active material includes the battery active material according to the first embodiment.

The nonaqueous electrolyte battery according to the second embodiment may further include a separator placed between the positive and negative electrodes. The positive electrode, negative electrode, and separator may compose an electrode group. The nonaqueous electrolyte may be sustained by the electrode group.

The electrode group may have, for example, a stacked structure. In the stacked electrode group, plural positive and negative electrodes are laminated alternately, with separators therebetween.

Alternatively, the electrode group may have a wound structure. The wound electrode group can be formed by winding a stack formed by stacking a positive electrode, a separator, and a negative electrode.

The nonaqueous electrolyte battery according to the second embodiment may further include a container member for housing the electrode group and nonaqueous electrolyte, a negative electrode terminal, and a positive electrode terminal.

The positive electrode and negative electrode may be spatially separated by placing a separator therebetween. The negative electrode terminal may be electrically connected to the negative electrode. The positive electrode terminal may be electrically connected to the positive electrode.

Subsequently, the container member, negative electrode, positive electrode, nonaqueous electrolyte, separator, positive electrode terminal, and negative electrode terminal will be described in detail.

1) Container Member

The container member is formed of, for example, laminate film having a thickness of 0.5 mm or less. Alternatively, the container member may be, for example, a metal container having a wall thickness of 1.0 mm or less. The metal container more preferably has a wall thickness of 0.5 mm or less.

The shape of the container member may be selected from, for example, flat type (thin type), angular type, cylinder type, coin type, and button type. Examples of the container member include, according to the battery dimension, a small battery container member for mounting on mobile electronic appliances or the like, and a large battery container member for mounting on a two-wheel to four-wheel vehicle or the like.

The laminate film is a multilayer film including resin layers and metal layer sandwiched between the resin layers. The metal layer is preferably aluminum foil or aluminum alloy foil, in order to reduce weight. The resin layer may be made of, for example, a polymer material such as polypropylene (PP), polyethylene (PE), nylon, or polyethylene terephthalate (PET). The laminate film can be formed into the shape of the container member by heat sealing.

The metal container is made of, for example, aluminum or aluminum alloy. The aluminum alloy is preferably an alloy including elements such as magnesium, zinc, or silicon. When the alloy includes a transition metal such as iron, copper, nickel, or chromium, the amount of the metal is preferably 100 ppm by mass or less.

2) Negative Electrode

The negative electrode may include a negative electrode current collector, and a negative electrode layer formed on one face or both faces of the negative electrode current collector.

The negative electrode current collector is preferably aluminum foil or aluminum alloy foil including an element such as Mg, Ti, Zn, Mn, Fe, Cu, or Si, which are electrochemically stable in the potential range higher than 1 V (vs. $Li/Li^+$). The aluminum foil or aluminum alloy foil can prevent dissolving and corrosive deterioration of the negative electrode current collector during over-discharge cycles.

The thickness of the aluminum foil and aluminum alloy foil is 20 μm or less, and more preferably 15 μm or less. The purity of the aluminum foil is preferably 99% or more. The aluminum alloy is preferably an alloy including an element such as magnesium, zinc, or silicon. On the other hand, the included amount of transition metal such as iron, copper, nickel, or chromium is preferably 1% or less.

The negative electrode layer may include a negative electrode active material, a conductive agent, and a binder.

The battery active material according to the first embodiment may be included in the negative electrode active material. As described in the explanation of the first embodiment, the negative electrode active material may include a negative electrode active material other than the battery active material according to the first embodiment.

The negative electrode active material preferably has a specific surface area of from 0.5 m$^2$/g to 50 m$^2$/g. When the specific surface area is 0.5 m$^2$/g or more, the inserting and extracting sites for lithium ions can be sufficiently secured. When the specific surface area is 50 m$^2$/g or less, the material is easily handled in industrial applications. The specific surface area is more preferably from 3 m$^2$/g to 30 m$^2$/g.

The conductive agent increases the current collecting performance of the negative electrode active material, and suppresses contact resistance between the active material and the current collector. Examples of conductive agent include a carbon material, a metal powder such as aluminum powder, and conductive ceramic such as TiO. Examples of the carbon material include acetylene black, carbon black, coke, carbon fiber, and graphite. More preferable is coke heat treated at a temperature of 800° C. to 2000° C. and having an average particle size of 10 μm or less, graphite, TiO powder, and carbon fiber having an average particle size of 1 μm or less. The BET specific surface area of the carbon material by N$_2$ adsorption is preferably 10 m$^2$/g or more.

The binder can bind the negative electrode active material with the conductive agent. Examples of binder include polytetrafluoroethylene (PTFE), polyvinylidene fluoride (PVdF), fluorine rubber, and styrene-butadiene rubber.

The proportional amounts of the negative electrode active material, conductive agent and binder in the negative electrode layer are preferably from 70% by mass to 96% by mass, from 2% by mass to 28% by mass, and from 2% by mass to 28% by mass, respectively. When the amount of the conductive agent is 2% by mass or more, the negative electrode layer has improved current collecting performance, and thus, large current characteristics of the nonaqueous electrolyte battery are improved. When the amount of the binder is 2% by mass or more, binding between the negative electrode layer and current collector is improved, and the cycling characteristics are improved. On the other hand, the amount of each of the conductive agent and binder is preferably 28% by mass or less, for achieving a high capacity.

The negative electrode is manufactured by, for example, suspending a negative electrode active material, a conductive agent, and a binder in a commonly used solvent to prepare a slurry, coating the slurry onto a current collector, drying, and then pressing the coat. Alternatively, the negative electrode may be manufactured by forming an active material, a conductive agent, and a binder into pellets, and then forming the pellets into a negative electrode layer on the current collector.

3) Positive Electrode

The positive electrode may include a positive electrode current collector, and a positive electrode layer formed on one face or both faces of the positive electrode current collector.

The positive electrode current collector is preferably, for example, aluminum foil or aluminum alloy foil including elements such as Mg, Ti, Zn, Mn, Fe, Cu, or Si.

The positive electrode layer may include a positive electrode active material, a conductive agent, and a binder.

Examples of the positive electrode active material include an oxide and a polymer.

Examples of the oxide include manganese dioxide (MnO$_2$), iron oxide, copper oxide, nickel oxide, in which Li is inserted, lithium manganese composite oxide (e.g., Li$_x$Mn$_2$O$_4$ or Li$_x$MnO$_2$), lithium nickel composite oxide (e.g., Li$_x$NiO$_2$), lithium cobalt composite oxide (Li$_x$CoO$_2$), lithium nickel-cobalt composite oxide (e.g., LiNi$_{1-y}$Co$_y$O$_2$), lithium manganese-cobalt composite oxide (e.g., Li$_x$Mn$_y$Co$_{1-y}$O$_2$), lithium nickel-manganese-cobalt composite oxide (for example, Li$_x$(Ni$_a$Mn$_b$Co$_c$)O$_2$, wherein a+b+c=1), lithium manganese-nickel composite oxide having a spinel structure (Li$_x$Mn$_{2-y}$Ni$_y$O$_4$), lithium phosphorous oxide having an olivine structure (e.g., Li$_x$FePO$_4$, Li$_x$Fe$_{1-y}$Mn$_y$PO$_4$, or Li$_x$CoPO$_4$), iron sulfate (Fe$_2$(SO$_4$)$_3$), or vanadium oxide (e.g., V$_2$O$_5$). The above-described x and y preferably satisfy 0<x≤1, and 0≤y≤1.

Examples of the polymer include conductive polymer materials such as polyaniline and polypyrrole, and disulfide polymer materials. Sulfur (S) and fluorocarbon are also useful as active materials.

Preferred examples of the positive electrode active material include lithium manganese composite oxide (Li$_x$Mn$_2$O$_4$), lithium nickel composite oxide (Li$_x$NiO$_2$), lithium cobalt composite oxide (Li$_x$CoO$_2$), lithium nickel-cobalt composite oxide (Li$_x$Ni$_{1-y}$Co$_y$O$_2$), lithium nickel-manganese-cobalt composite oxide (e.g., Li$_x$(Ni$_a$Mn$_b$Co$_c$)O$_2$ wherein a+b+c=1), lithium manganese-nickel composite oxide having a spinel structure (Li$_x$Mn$_{2-y}$Ni$_y$O$_4$), lithium manganese-cobalt composite oxide (Li$_x$Mn$_y$Co$_{1-y}$O$_2$), and lithium iron phosphate (Li$_x$FePO$_4$), which have high positive electrode voltage. The above-described x and y preferably satisfy 0<x≤1 and 0≤y≤1.

From the viewpoint of high temperature durability, the positive electrode active material is even more preferably lithium manganese composite oxide having a spinel structure (Li$_x$Mn$_2$O$_4$), lithium nickel-manganese-cobalt composite oxide having a layered structure (for example, Li$_x$(Ni$_a$Mn$_b$Co$_c$)O$_2$, wherein a+b+c=1), and lithium iron phosphate having an olivine structure (Li$_x$FePO$_4$). These active materials have high structure stability, and are excellent in charge and discharge reversibility, so that life performance and higher high temperature durability can be achieved when combined with the above-described negative electrode active material.

In addition, a nonaqueous electrolyte battery including a negative electrode including the battery active material according to the first embodiment, and a lithium manganese composite oxide (Li$_x$Mn$_2$O$_4$) positive electrode or a lithium nickel-manganese-cobalt composite oxide (e.g., Li$_x$(Ni$_a$Mn$_b$Co$_c$)O$_2$, wherein a+b+c=1) positive electrode can compose a 12 V system exhibiting excellent compatibility with a lead storage battery, by connecting five of the batteries in series. In addition, a nonaqueous electrolyte battery including a negative electrode including the battery active material according to the first embodiment, and a lithium iron phosphate (Li$_x$FePO$_4$) positive electrode can compose a 12 V system exhibiting excellent compatibility with a lead storage battery, by connecting six of the batteries in series. By composing as such, it is possible to provide a battery module and a battery pack having excellent high temperature durability that can be used in an engine room.

The conductive agent improves the current collecting performance of the active material, and suppresses contact resistance between the active material and the current collector. Examples of conductive agent include carbonaceous substances such as acetylene black, carbon black, and graphite.

The binder binds the active material with the conductive agent. Examples of binder include polytetrafluoroethylene (PTFE), polyvinylidene fluoride (PVdF), and fluorine rubber.

The proportional amounts of the positive electrode active material, conductive agent, and binder in the positive electrode layer are preferably from 80% by mass to 95% by mass, from 3% by mass to 18% by mass, and from 2% by mass to 17% by mass, respectively. When the amount of the conductive agent is 3% by mass or more, the above-described effect is achieved. When the amount of the conductive agent is 18% by mass or less, decomposition of the nonaqueous electrolyte on the surface of the conductive agent during high temperature storage can be reduced. When the amount of the binder is 2% by mass or more, sufficient durability of the positive electrode is obtained. When the amount of the binder is 17% by mass or less, the amount of the binder, which is an insulating material, within the positive electrode is reduced, whereby the internal resistance is decreased.

The positive electrode is manufactured by, for example, suspending a positive electrode active material, a conductive agent, and a binder in a commonly used solvent to prepare a slurry, coating the slurry onto a current collector, and drying and pressing the coat. Alternatively, the positive electrode may be manufactured by forming a positive electrode active material, a conductive agent, and a binder into pellets, and forming the pellets into a positive electrode layer on the current collector.

4) Nonaqueous Electrolyte

The nonaqueous electrolyte may be, for example, a liquid nonaqueous electrolyte prepared by dissolving an electrolyte in an organic solvent, or a gel-form nonaqueous electrolyte that is a composite of a liquid electrolyte and a polymer material.

The liquid state nonaqueous electrolyte is preferably prepared by dissolving an electrolyte in an organic solvent at a concentration of 0.5 M to 2.5 M.

Examples of the electrolyte include lithium salts such as lithium perchlorate ($LiClO_4$), Lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide [$LiN(CF_3SO_2)_2$], and mixtures thereof. The electrolyte is preferably resistant to oxidation at a high potential, and is most preferably $LiPF_6$.

Examples of the organic solvent include cyclic carbonates such as propylene carbonate (PC), ethylene carbonate (EC), and vinylene carbonate; linear carbonates such as diethyl carbonate (DEC), dimethyl carbonate (DMC), and methylethyl carbonate (MEC); cyclic ethers such as tetrahydrofuran (THF), 2-methyltetrahydrofuran (2-MeTHF), and dioxolane (DOX); linear ethers such as dimethoxyethane (DME) and diethoxyethane (DEE); and γ-butyrolactone (GBL), acetonitrile (AN), and sulfolane (SL). These organic solvents may be used alone or in the form of a mixed solvent.

Examples of the polymer material include polyvinylidene fluoride (PVdF), polyacrylonitrile (PAN), and polyethylene oxide (PEO).

The organic solvent is preferably a mixed solvent including at least two or more selected from the group consisting of propylene carbonate (PC), ethylene carbonate (EC), and diethyl carbonate (DEC), or a mixed solvent including γ-butyrolactone (GBL). By using these mixed solvent, a nonaqueous electrolyte battery having excellent high temperature characteristics can be obtained.

5) Separator

The separator may be, for example, a porous film or a synthetic resin nonwoven fabric including polyethylene, polypropylene, cellulose, or polyvinylidene fluoride (PVdF). The porous film is preferably made of polyethylene or polypropylene. Such a porous film becomes molten at a certain temperature and blocks current, and is therefore able to improve safety.

6) Negative Electrode Terminal

The negative electrode terminal may be, for example, a material having electrical stability and electrical conductivity in a potential range relative to lithium ion metal of from 1 V to 3 V. Specific examples include aluminum and an aluminum alloy including an element such as Mg, Ti, Zn, Mn, Fe, Cu, or Si. The negative electrode terminal is preferably the same material as the negative electrode current collector, in order to reduce contact resistance between the negative electrode terminal and the negative electrode current collector.

7) Positive Electrode Terminal

The positive electrode terminal may be a material having electrical stability and electrical conductivity in a potential range relative to lithium ion metal of from 3 V to 4.25 V. Specific examples include aluminum and an aluminum alloy including an element such as Mg, Ti, Zn, Mn, Fe, Cu, or Si. The positive electrode terminal is preferably the same material as the positive electrode current collector, in order to reduce contact resistance between the positive electrode terminal and the positive electrode current collector.

Next, examples of the nonaqueous electrolyte battery according to the second embodiment are described with reference to drawings.

FIG. 1 is a schematic cross-sectional view of an example of the nonaqueous electrolyte battery according to the second embodiment. FIG. 2 is an enlarged cross-sectional view of section A of the nonaqueous electrolyte battery of FIG. 1.

A nonaqueous electrolyte battery 100 shown in FIGS. 1 and 2 include a flat and wound electrode group 1.

The flat and wound electrode group 1 includes, as shown in FIG. 2, a negative electrode 3, a separator 4, and a positive electrode 5. The separator 4 is sandwiched between the negative electrode 3 and positive electrode 5. This flat and wound electrode group 1 can be formed by, for example, stacking the negative electrode 3, separator 4, positive electrode 5, and another separator 4 to form a stack in such a manner that the separator 4 is sandwiched between the negative electrode 3 and positive electrode 5, and, as shown in FIG. 2, winding the stack in a spiral with negative electrode 3 on the outside, and then press-molding the wound stack.

The negative electrode 3 includes a negative electrode current collector 3a and a negative electrode layer 3b. As shown in FIG. 2, negative electrode 3 at the outermost shell has a structure wherein the negative electrode layer 3b is formed only on the surface of the negative electrode current collector 3a faced toward the center of the electrode group. In negative electrode 3 elsewhere, the negative electrode layer 3b is formed on both faces of the negative electrode current collector 3a.

In positive electrode 5, positive electrode layers 5b are formed on both faces of a positive electrode current collector 5a.

As shown in FIG. 1, in the vicinity of the outer peripheral edge of the wound electrode group 1, a negative electrode terminal 6 is connected to the negative electrode current collector 3a of negative electrode 3 at the outermost shell, and a positive electrode terminal 7 is connected to the positive electrode current collector 5a of positive electrode 5 at an inner side.

The wound electrode group 1 is housed in a bag-like container 2 made of laminate film including two resin layers and a metal layer sandwiched therebetween.

The negative electrode terminal 6 and positive electrode terminal 7 extend out from an opening of the bag-like container 2. For example, a liquid nonaqueous electrolyte is poured in from the opening of the bag-like container 2, and housed in the bag-like container 2.

The bag-like container 2 is heat-sealed with the negative electrode terminal 6 and positive electrode terminal 7 sandwiched at the opening, whereby the wound electrode group 1 and liquid nonaqueous electrolyte are completely sealed in.

Since the nonaqueous electrolyte battery according to the second embodiment explained above includes the battery active material according to the first embodiment, it exhibits excellent input and output characteristics and life characteristics.

Third Embodiment

According to the third embodiment, a battery module is provided. The battery module according to the third embodiment includes plural of the nonaqueous electrolyte batteries according to the second embodiment.

In the battery module according to the third embodiment, the unit cells may be arranged to be electrically connected in series or in parallel, or they may be arranged in a combination of connection in series and connection in parallel.

For example, the battery module according to the third embodiment can include 6 m of nonaqueous electrolyte batteries including a negative electrode including the battery active material according to the first embodiment, a positive electrode including an iron-including phosphate compound having an olivine structure, and a nonaqueous electrolyte. Herein, m is an integer of 1 or more. The 6 m of the nonaqueous electrolyte batteries may be connected in series to compose a battery module. As explained in the second embodiment, the nonaqueous electrolyte batteries included in the battery module of this example can compose a 12 V system exhibiting excellent compatibility with a lead storage battery, by connecting six in series, and is excellent in high temperature durability. Therefore, the battery module of this example can be used in an engine room together with a lead storage battery.

Further, for example, the battery module according to the third embodiment can include 5 n of nonaqueous electrolyte batteries including a negative electrode including the battery active material according to the first embodiment, a positive electrode including at least one selected from the group consisting of a lithium manganese composite oxide having a spinel structure and a lithium nickel-manganese-cobalt composite oxide having a layered structure, and a nonaqueous electrolyte. Herein, n is an integer of 1 or more. The 5n of the nonaqueous electrolyte batteries may be connected in series to compose a battery module. As explained in the second embodiment, the nonaqueous electrolyte batteries included in the battery module of this example can compose a 12 V system exhibiting excellent compatibility with a lead storage battery, by connecting five in series, and is excellent in high temperature durability. Therefore, the battery module of this example can be used in an engine room together with a lead storage battery.

Next, an example of the battery module according to the third embodiment is described with reference to a drawing.

FIG. 3 is a schematic perspective view showing an example of the battery module according to the third embodiment. The battery module 23 shown in FIG. 3 includes five unit cells 21. Each of the five unit cells 21 is an example of an angular nonaqueous electrolyte battery according to the second embodiment.

A battery module 23 shown in FIG. 3 further includes four leads 20. A lead 20 connects a negative electrode terminal 6 of a unit cell 21 with a positive electrode terminal 7 of another unit cell 21. In this manner, the five unit cells 21 are connected in series by the four leads 20. More specifically, the battery module 23 shown in FIG. 3 is a 5-serial battery module.

As shown in FIG. 3, the positive electrode terminal 7 of one of the five unit cells 21 is connected to a positive electrode lead 28 for external connection. Also, the negative electrode terminal 6 of one of the five unit cells 21 is connected to a negative electrode lead 30 for external connection.

The battery module according to the third embodiment includes the nonaqueous electrolyte battery according to the second embodiment, therefore, it exhibits excellent input and output characteristics and life characteristics.

Fourth Embodiment

The battery pack according to the fourth embodiment includes the nonaqueous electrolyte battery according to the second embodiment.

The battery pack according to the fourth embodiment may include one or more nonaqueous electrolyte batteries. When the battery pack according to the fourth embodiment includes plural nonaqueous electrolyte batteries, each of the unit cells may be arranged to be electrically connected in series or in parallel, or they may be arranged in combination of connecting in series and in parallel.

Alternatively, the battery pack according to the fourth embodiment may include the battery module according to the third embodiment.

Next, an example of the battery pack according to the fourth embodiment is described with reference to drawings.

FIG. 4 is an exploded perspective view of an example of the battery pack according to the fourth embodiment. FIG. 5 is a block diagram showing the electric circuit of the battery pack shown in FIG. 4.

A battery pack 200 shown in FIGS. 4 and 5 includes plural flat batteries 21 having the structure shown in FIGS. 1 and 2. That is, the battery pack 200 shown in FIGS. 4 and 5 include plural nonaqueous electrolyte batteries of an example of the first embodiment.

The plural unit cells 21 are stacked in such a manner that the negative electrode terminal 6 and positive electrode terminal 7, which extend out from the unit cells, are aligned in the same direction, and bound with an adhesive tape 22, thereby composing the battery module 23. These unit cells 21 are electrically connected in series as shown in FIG. 5.

A printed wiring board 24 is disposed facing against the side surface from which the negative electrode terminal 6 and positive electrode terminal 7 of the plural unit cells 21 extend out. As shown in FIG. 5, a thermistor 25, a protective circuit 26, and an energizing terminal 27 to an external device are mounted on the printed wiring board 24. An insulating plate (not shown) is mounted on the surface of the printed wiring board 24 facing against the battery module 23, thereby avoiding unnecessary electrical connection with the wiring of the battery module 23.

A positive electrode lead 28 is connected to the positive electrode terminal 7 of a unit cell 10 located on the lowermost layer of the battery module 23, and its tip is inserted into and electrically connected to a positive electrode connector 29 of the printed wiring board 24. A negative electrode lead 30 is connected to the negative electrode terminal 6 of the unit cell 21 located on the uppermost layer of the battery module 23, and its tip is inserted into and electrically connected to a negative electrode connector 31 of the printed wiring board 24. The connectors 29 and 31 are connected to the protective circuit 26 through wirings 32 and 33 formed on the printed wiring board 24, respectively.

The thermistor 25 detects the temperature of each unit cell 21, and transmits the detected signal to the protective circuit 26. Under predetermined conditions, the protective circuit 26 can block the positive wiring 34a and negative wiring 34b between the protective circuit 26 and the energizing terminal 27 to an external device. Predetermined conditions are satisfied when, for example, a signal is received from thermistor 25, indicating that the temperature of unit cells 21 is higher than the predetermined temperature. Alternatively, predetermined conditions are satisfied when, for example, over-charge, over-discharge, or over-current of unit cells 21 is detected. The detection of over-charge and the like is carried out for each or all of the unit cells 21. When each of the unit cells 21 is detected, the battery voltage may be detected, or the positive or negative electrode potential may be detected. In the latter case, a lithium electrode used as the reference electrode is inserted into each of the unit cells 21. In the battery pack 200 shown in FIGS. 4 and 5, wirings 35 for detecting voltage are connected to each unit cell 21, and detection signals are transmitted to the protective circuit 26 through the wirings 35.

A protective sheet 36 made of rubber or resin is placed on each of the three side surfaces of the battery module 23 aside of the side surface from which the positive electrode terminal 7 and the negative electrode terminal 6 extend out.

The battery module 23 is housed in a housing container 37 together with the protective sheets 36 and printed wiring board 24. More specifically, protective sheets 36 are arranged on both inner side surfaces along the long direction and an inner side surface along the short direction of the housing container, respectively, and the printed wiring board 24 is disposed on the opposite inner side surface along the short direction. The battery module 23 is located in a space surrounded by the protective sheets 36 and printed wiring board 24. A cover 38 is mounted on top of the housing container 37.

In order to fix the battery module 23, a heat-shrinkable tape may be used in place of the adhesive tape 22. In this case, the battery module is bound by arranging protective sheets on opposite side surfaces of the battery module, revolving the heat-shrinkable tape, and thermally shrinking the heat-shrinkable tape.

In the battery pack 200 shown in FIGS. 4 and 5, the plural unit cells 21 are connected in series; however, in the battery pack according to the fourth embodiment, in order to increase battery capacity, the plural unit cells 21 may be connected in parallel. Alternatively, the battery pack according to the fourth embodiment may include plural unit cells 21 connected in a combination of in series and in parallel. Assembled battery packs 200 may be further connected in series or in parallel.

The battery pack 200 shown in FIGS. 4 and 5 includes plural unit cells 21; however, the battery pack according to the fourth embodiment may include a single unit cell 21.

The embodiment of the battery pack is appropriately changed according to the intended use. The battery pack according to the embodiment is suitably used in uses that require excellent cycling characteristics when a large current is taken out. Specifically, the battery pack is suitably used as a power source of a digital camera, or as a battery for mounting on vehicles such as a two-wheel to four-wheel hybrid electric vehicle, a two-wheel to four-wheel electric vehicle, and a power-assisted bicycle. In particular, the battery pack is suitably used as a battery for mounting on vehicles.

Since the battery pack according to the fourth embodiment includes the nonaqueous electrolyte battery according to the second embodiment, it can exhibit excellent input and output characteristics and life characteristics.

Fifth Embodiment

The vehicle according to the fifth embodiment includes the battery pack according to the fourth embodiment. Examples of the vehicle include two-wheel to four-wheel vehicles equipped with an idling stop mechanism, two-wheel to four-wheel hybrid electric vehicles, two-wheel to four-wheel electric vehicles, and power-assisted bicycles.

FIG. 6 shows an example of the vehicle according to the fifth embodiment. As shown in FIG. 6, a vehicle 41 of the fifth embodiment has a battery pack 42 according to the fourth embodiment mounted in the engine room. By installing the battery pack in the vehicle engine room under high temperature environment, distance from the battery pack to electric drive apparatuses such as a motor and an inverter is shortened, thereby reducing output and input losses, and the fuel consumption efficiency improves.

According to the fifth embodiment, since the battery pack according to the fourth embodiment is included, a vehicle mounted with an electrochemical apparatus, which can exhibit excellent particle size input and output characteristics and life characteristics, can be provided.

EXAMPLES

Examples are described below, but the present invention is not limited to the following examples, so long as it does not depart from the spirit of the present invention.

Example 1

In Example 1, a beaker cell of Example 1 was manufactured by the following procedure.

<Preparation of Active Material>

Lithium carbonate ($Li_2CO_3$), sodium carbonate ($Na_2CO_3$), and titanium dioxide ($TiO_2$) of an anatase structure were mixed at a molar ratio of 1:1:6.4. This mixture was calcined at 800° C. for 3 hours. Subsequently, the calcined product was pulverized using a mill, thereby resolving agglomeration. In this manner, the battery active material of Example 1 was obtained.

Through wide-angle X-ray diffraction described below, the obtained battery active material of Example 1 was found to include a mixed phase substance of a phase of titanium-including composite oxide represented by general formula Li$_2$Na$_2$Ti$_6$O$_{14}$ having a crystal structure belonging to the space group Fmmm and anatase type titanium dioxide phase. In the XRD chart examined for the battery active material of Example 1, an intensity ratio Z (=Y/X) was 0.5, wherein X is the main peak of the titanium-including oxide, and Y is the main peak of the anatase titanium dioxide. Furthermore, the pH of the battery active material of Example 1 was measured by the method explained above. In the result, the pH of the battery active material of Example 1 was 10.8.

<Wide-Angle X-Ray Diffraction>

The obtained battery active material was loaded into a standard glass holder having a diameter of 25 mm, and measured by wide-angle X-ray diffraction. As a result, the X-ray diffraction pattern shown in FIG. 6 was obtained. From this diffraction pattern, the main substance composing the obtained titanium-including oxide was found to include a mixed phase substance of a phase of titanium-including composite oxide represented by general formula Li$_2$Na$_2$Ti$_6$O$_{14}$ assigned to JCPDS (Joint Committee on Powder Diffraction Standards): 52-690, and anatase type titanium dioxide phase assigned to JCPDS: 21-1272. The apparatus and conditions used for the measurement are described below.

(1) X-ray generator manufactured by Rigaku Corporation, RU-200R (rotating cathode type)
X-ray source: CuKα line
Curved crystal monochromator (graphite) used
Output: 50 kV, 200 mA
(2) Goniometer manufactured by Rigaku Corporation, Model 2155S2
Slit system: 1°-1°-0.15 mm-0.45 mm
Detector: scintillation counter
(3) Count recorder manufactured by Rigaku Corporation, Model RINT1400
(4) Scan system 2θ/θ continuous scanning
(5) Qualitative analysis

| Measurement range (2θ) | 5° to 100° |
|---|---|
| Scanning speed | 2°/minute |
| Step width (2θ) | 0.02°. |

<Manufacture of Electrode>

The battery active material of Example 1, acetylene black as a conductive agent, and polyvinylidene fluoride (PVdF) as a binder were added to N-methylpyrrolidone (NMP) and mixed to prepare a slurry. The mass ratio between the battery active material:acetylene black:PVdF was 90:5:5. The slurry was coated onto both faces of a current collector made of aluminum foil having a thickness of 12 μm, and dried. Thereafter, the coat was pressed, and thus an electrode of Example 1 having an electrode density of 2.2 g/cm$^3$ (excluding the current collector) was obtained.

<Preparation of Liquid Nonaqueous Electrolyte>

Ethylene carbonate (EC) and diethyl carbonate (DEC) were mixed at a volume ratio of 1:2 to obtain a mixed solvent. LiPF$_6$ as an electrolyte was dissolved in the mixed solvent at a concentration of 1 M, thus obtaining a liquid nonaqueous electrolyte.

<Manufacture of Beaker Cell>

A beaker cell was manufactured using the electrode manufactured above as the working electrode, and lithium metal as the counter electrode and reference electrode. The above-described liquid nonaqueous electrolyte was poured into the beaker cell, thereby completing the beaker cell of Example 1.

<Measurement of Battery Performance>

The beaker cell of Example 1 was subjected to 3 hours of a constant current-constant voltage discharging of 1 C and 1 V under a 25° C. environment, thereby performing lithium insertion. Subsequently, the beaker cell of Example 1 was subjected to constant current charging at 1 C until the cell voltage reached 3 V, thereby performing Li extraction. This charging and discharging cycle was repeated 100 times. Table 1 shows the capacity retention rate (=the capacity after 100 cycles/initial capacity×100[%]), which is indicative of the life characteristics of the battery active material.

<Specific Surface Area>

The specific surface area of the battery active material was measured by the above-described method. As a result, the specific surface area of the battery active material of Example 1 was 6.4 m$^2$/g.

<Average Particle Size>

As a result of the examination by SEM, the battery active material of Example 1 was in the form of single particles. The average particle size of the battery active material of Example 1 was measured by the procedure explained above. As a result, the average primary particle size of the battery active material of Example 1 was 0.62 μm.

Examples 2 to 4, Comparative Example 1

In Examples 2 to 4 and Comparative Example 1, the battery active materials of Examples 2 to 4 and Comparative Example 1 were obtained in the same manner as in Example 1, except that the mixing ratio was changed between lithium carbonate (Li$_2$CO$_3$), sodium carbonate (Na$_2$CO$_3$), and titanium dioxide (TiO$_2$) of an anatase structure as the raw materials, such that in the XRD chart, the intensity ratio Z (=Y/X) of the main peak Y of the titanium dioxide of an anatase structure to the main peak X of the titanium-including oxide would change to values shown in Table 1. Specifically, the mixing ratio of the raw materials was changed such that, in the molar ratio between lithium carbonate (Li$_2$CO$_3$):sodium carbonate (Na$_2$CO$_3$):titanium dioxide (TiO$_2$) of an anatase structure=1:1:α, α was 6.1 in Example 2, 6.2 in Example 3, 7.0 in Example 4, and 6.0 in Comparative Example 1. In addition, the beaker cells of Examples 2 to 4 and Comparative Example 1 were manufactured in the same manner as in Example 1, except that the obtained battery active materials were used. Each of the obtained beaker cells were subjected to evaluation of the capacity retention rate, with the same procedure as in Example 1. Results are shown in Table 1, together with the measurement results of the average particle size and specific surface area obtained by the above-described procedure. The battery active materials of Examples 2 to 4 and Comparative Example 1 had a pH within a range of 10.8 to 10.9.

Figure 7:
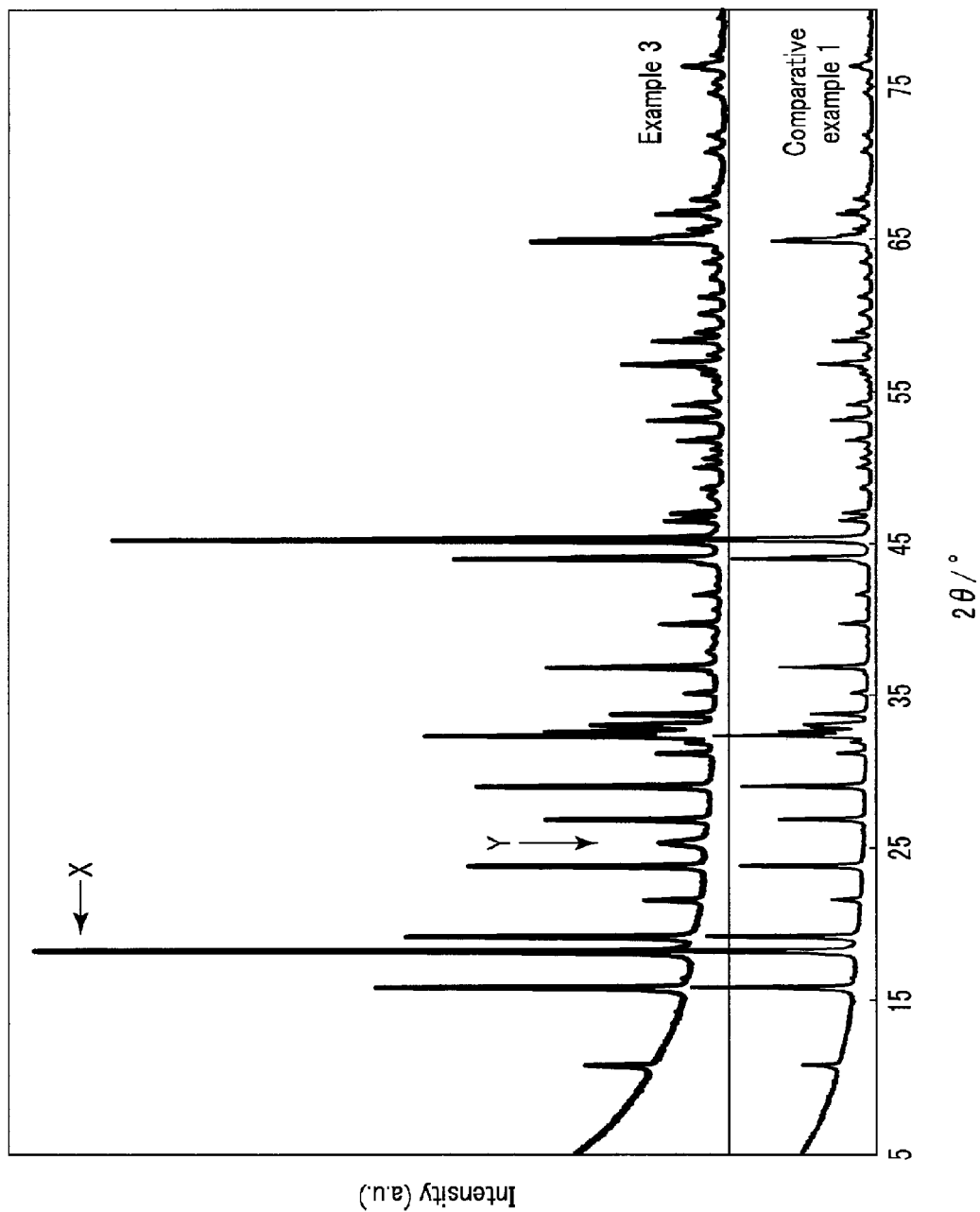
FIG. 7 is an XRD pattern of the battery active materials of Example 3 and Comparative Example 1.

FIG. 7 shows the XRD patterns of the battery active material of Example 3 and the battery active material of Comparative Example 1. In the XRD pattern of the battery active material of Example 3, main peak (X) of the titanium-including composite oxide represented by Li$_2$Na$_2$Ti$_6$O$_{14}$ was found in the vicinity of 18°, main peak (Y) of the anatase type titanium dioxide was found in the vicinity of 25°, and the intensity ratio Z (=Y/X) was 0.1. On the other hand, in the XRD pattern of the battery active material of Comparative Example 1, although the main peak (x) of the titanium-including composite oxide represented by Li$_2$Na$_2$Ti$_6$O$_{14}$ was found in the vicinity of 18°, main peak (Y) of anatase type titanium dioxide was not found.

Comparative Example 2

In Comparative Example 2, the battery active material of Comparative Example 1 and the anatase type titanium dioxide particles (average particle size 25 nm) were mixed at a mass ratio of 95:5, thereby obtaining the battery active material of Comparative Example 2. When the battery active material was subjected to XRD measurement, in the XRD chart, the intensity ratio Z (=Y/X) of the main peak Y of the anatase type titanium dioxide to the main peak X of the titanium-including oxide was 0.1. In addition, the beaker cell of Comparative Example 2 was manufactured in the same manner as in Example 1, except that this active material was used. The thus manufactured beaker cell of Comparative Example 2 was subjected to evaluation of the capacity retention rate, with the same procedure as in Example 1. The result is shown in Table 1, together with measurement results of the average particle size and specific surface area obtained by the above-described procedure.

TABLE 1

|  | Mean Particle Diameter (μm) | Specific Surface Area (m$^2$/g) | Main Peak Intensity Ratio Z | Capacity (mAh/g) | Capacity Retention Rate (%) |
|---|---|---|---|---|---|
| Comparative Example 1 | 0.65 | 4.5 | — | 93 | 84.8 |
| Example 2 | 0.65 | 4.5 | 0.01 | 95 | 92.2 |
| Example 3 | 0.64 | 4.4 | 0.1 | 97 | 93.1 |
| Example 1 | 0.67 | 4.7 | 0.5 | 93 | 95.8 |
| Example 4 | 0.66 | 4.7 | 1.3 | 86 | 96.0 |
| Comparative Example 2 | 0.64 | 4.4 | 0.1 | 86 | 85.0 |

The results shown in Table 1 indicate that the beaker cells of Examples 1 to 4, where the battery active material used includes the mixed phase of a phase of titanium-including composite oxide represented by general formula $Li_2Na_2Ti_6O_{14}$ and anatase type titanium dioxide phase, were more excellent in capacity retention rates than the battery active material of Comparative Example 1, where the used battery active material included no anatase type titanium dioxide. In particular, the beaker cells of Examples 1 to 3 having the main peak intensity ratio Z within the range of 0.01 to 0.5 achieved both a high capacity and a long life.

In addition, the beaker cell of Comparative Example 2 had a smaller capacity and a lower capacity retention rate than the beaker cell of Example 3, where the active material used includes a mixed phase state of a phase of titanium-including composite oxide $Li_2Na_2Ti_6O_{14}$ and anatase type titanium dioxide phase. The reason for this is considered to be that, in Comparative Example 2 wherein the powders were simply mixed, contact between the titanium-including composite oxide particles and anatase type titanium dioxide particles was resolved due to volume changes of the active material particles associated with charging and discharging, dismembering the current collecting network within the electrode, and consequently, decreased the capacity retention rate. On the other hand, it is considered that in the battery active material of Example 3, which includes a mixed phase state, both phases are firmly bonded together by chemical bonding, so that the contact between these phases do not become resolved even after repetitive charging and discharging, thereby exhibiting good cycling characteristics, that is, good capacity retention rate.

Example 11

In Example 11, the battery active material of Example 11 was obtained by the following procedure. First, lithium carbonate ($Li_2CO_3$), strontium carbonate ($SrCO_3$), and titanium dioxide ($TiO_2$) of an anatase structure were mixed at a molar ratio of 1:1:6.4. The thus obtained mixture was calcined at 1100° C. for 3 hours. Subsequently, the calcined product was pulverized using a mill, thereby resolving agglomeration. In this manner, the battery active material of Example 11 was obtained.

Using the above-described wide-angle X-ray diffraction, the thus obtained battery active material of Example 11 was found to include a mixed phase substance of a phase of titanium-including composite oxide represented by general formula $Li_2SrTi_6O_{14}$ having a crystal structure belonging to a space group Cmca and rutile type titanium dioxide phase. In addition, in the XRD chart of the battery active material of Example 11, the intensity ratio Z (=Y/X) of main peak Y of the rutile type titanium dioxide to main peak X of the titanium-including composite oxide was found to be 0.5. In addition, the pH, average primary particle size of the powder, and specific surface area of the battery active material of Example 11 were measured by the above-described method. As a result, the battery active material of Example 11 had a pH of 10.9, the average primary particle size of the powder was 0.72 μm, and the specific surface area was 6.0 m$^2$/g.

Subsequently, the beaker cell of Example 11 was manufactured in the same manner as in Example 1, except that the battery active material of Example 11 was used. The thus manufactured beaker cell of Example 11 was subjected to evaluation of the capacity retention rate with the same procedure as in Example 1. The result is shown in Table 2, together with measurement results of the average particle size and specific surface area obtained by the above-described procedure.

Examples 12 to 14 and Comparative Example 11

In Examples 12 to 14 and Comparative Example 11, the battery active materials of Examples 12 to 14 and Comparative Example 11 were obtained in the same manner as in Example 1, except that the mixing ratio between lithium carbonate ($Li_2CO_3$), strontium carbonate ($SrCO_3$), and titanium dioxide ($TiO_2$) of anatase structure as the raw materials was changed, such that in the XRD chart, the intensity ratio Z (=Y/X) of main peak Y of the rutile type titanium dioxide to main peak X of the titanium-including composite oxide would change to values shown in Table 2. Specifically, mixing ratios of the raw materials were changed such that, in the molar ratio between lithium carbonate ($Li_2CO_3$):strontium carbonate ($SrCO_3$):titanium dioxide ($TiO_2$) of anatase structure=1:1:β,β was 6.1 in Example 12, 6.2 in Example 13, 7.0 in Example 14, and 6.0 in Comparative Example 11. Beaker cells were manufactured using the obtained battery active materials. The obtained beaker cells were subjected to evaluation of the capacity retention rate, with the same procedure as in Example 1. Results are shown in Table 2, together with measurement results of the average particle size and specific surface area obtained by the above-described procedure. The battery active materials of Examples 12 to 14 and Comparative Example 11 had a pH within the range of 10.8 to 10.9.

Comparative Example 12

In Comparative Example 12, the battery active material of Comparative Example 12 was obtained in the same manner as in Example 11, except that the battery active material of Comparative Example 11 and rutile type titanium dioxide particles (average particle size 25 nm) were mixed at a mass ratio of 95:5. When the battery active material was subjected to XRD measurement, in the XRD chart, the intensity ratio Z of main peak Y of the rutile type titanium dioxide to main peak X of the titanium-including composite oxide was 0.1. In addition, the beaker cell of Comparative Example 12 was manufactured in the same manner as in Example 1, except that this active material was used. The manufactured beaker cell was subjected to evaluation of the capacity retention rate, with the same procedure as in Example 1. Results are shown in Table 2, together with measurement results of the average particle size and specific surface area obtained by the above-described procedure.

TABLE 2

|  | Mean Particle Diameter (μm) | Specific Surface Area (m$^2$/g) | Main Peak Intensity Ratio Z | Capacity (mAh/g) | Capacity Retention Rate (%) |
| --- | --- | --- | --- | --- | --- |
| Comparative Example 11 | 0.76 | 5.8 | — | 121 | 86.6 |
| Example 12 | 0.74 | 5.8 | 0.01 | 124 | 92.1 |
| Example 13 | 0.74 | 6.0 | 0.1 | 130 | 93.0 |
| Example 11 | 0.72 | 6.0 | 0.5 | 121 | 95.2 |
| Example 14 | 0.72 | 6.1 | 1.3 | 112 | 95.8 |
| Comparative Example 12 | 0.74 | 6.0 | 0.1 | 115 | 87.0 |

The results shown in Table 2 indicate that the beaker cells of Examples 11 to 14, where the battery active material used includes the mixed phase substance of a phase of titanium-including composite oxide represented by general formula $Li_2SrTi_6O_{14}$ and rutile type titanium dioxide phase, achieve the same effect as the beaker cells of Examples 1 to 4, where the battery active material used includes a mixed phase substance of a phase of titanium-including composite oxide represented by general formula $Li_2Na_2Ti_6O_{14}$ and rutile type titanium dioxide phase. In addition, the comparison between Example 13 and Comparative Example 12 indicates that the improvement of the capacity retention rate cannot be achieved by simply mixing the powders of $Li_2SrTi_6O_{14}$ and rutile type titanium dioxide.

Examples 21 to 23

In Examples 21 to 23, the battery active materials of Examples 21 to 23 were obtained by the following procedure. First, maltose was added to the active material synthesized in Example 2, and mixed with pure water in a beaker. In Example 21, 2 g of maltose was mixed with 100 g of the battery active material. In Example 22, 5 g of maltose was mixed with 100 g of the battery active material. In Example 23, 15 g of maltose was mixed with 100 g of the battery active material.

Subsequently, the mixture was thoroughly dispersed by a stirrer using a rotator, and then dried by evaporation. In this manner, a complex where the battery active material particle surface is uniformly coated with an organic substance was obtained. Subsequently, the thus obtained complex was subjected to carbonization heat treatment by calcining at 500° C. for 1 hour in an inert atmosphere under argon flow, thereby carbonizing the organic substance. In this manner, the battery active materials of Examples 21 to 23 were obtained.

In Examples 21 to 23, the beaker cells of Examples 21 to 23 were manufactured in the same manner as in Example 1, except that the battery active material prepared as described above was used. The manufactured beaker cells of Examples 21 to 23 were subjected to evaluation of the capacity retention rate with the same procedure as in Example 1. Results are shown below in Table 3, together with measurement results of carbon amount obtained by the above-described procedure. For comparison, the capacity retention rate of Example 2 is shown again in Table 3.

TABLE 3

|  | Carbon Amount (Mass %) *Z = 0.1 | Capacity (mAh/g) | Capacity Retention Rate (%) |
| --- | --- | --- | --- |
| Example 2 | 0 | 97 | 93.1 |
| Example 21 | 0.3 | 98 | 94.9 |
| Example 22 | 1 | 107 | 96.0 |
| Example 23 | 3 | 103 | 96.0 |

The beaker cells of Examples 21 to 23, which use active materials where a carbon-including layer was formed, showed greater capacity and higher capacity retention rates than the beaker cell of Example 2 that does not include a carbon-including layer. In particular, marked effect was achieved when the carbon amount was from 1 to 3% by mass, as in Examples 22 and 23.

Example 41

In Example 41, the nonaqueous electrolyte battery of Example 41 was manufactured using the following materials.

As the negative electrode active material, the battery active material synthesized in Example 1 was used. As the positive electrode active material, a lithium manganese composite oxide ($Li_{1.1}Mn_{1.9}Al_{0.1}O_4$) was used. As the nonaqueous electrolyte, a liquid electrolyte prepared by dissolving $LiBF_4$ in a PC/GBL (1:2) mixed solvent at a concentration of 1.5 M was used. For the container member, laminate film was used.

The manufactured nonaqueous electrolyte battery of Example 41 was a laminate battery having dimensions of thickness 4 mm×width 72 mm×height 100 mm, and a capacity of 2 Ah. The battery voltage of the battery of Example 41 was 2.85 V. As such, it was found that the battery voltage of the nonaqueous electrolyte battery of Example 41 would be a voltage compatible with a lead battery when five are connected in series.

Example 42

In Example 42, the nonaqueous electrolyte battery of Example 42 was manufactured using the following materials.

As the negative electrode active material, the battery active material synthesized in Example 1 was used. As the positive electrode active material, a lithium nickel-manganese-cobalt manganese-cobalt composite oxide ($LiNi_6Mn_2Co_2O_4$) was used. As the nonaqueous electrolyte, a liquid electrolyte prepared by dissolving $LiBF_4$ in a PC/GBL (1:2) mixed solvent at a concentration of 1.5 M was used. As the container member, laminate film was used.

The manufactured nonaqueous electrolyte battery of Example 42 was a laminate battery having dimensions of thickness 3.4 mm×width 72 mm×height 100 mm, and a capacity of 2 Ah. The battery voltage of the battery of Example 42 was 2.6 V. As such, it was found that the battery voltage of the nonaqueous electrolyte battery of Example 42 would be a voltage compatible with a lead battery when five are connected in series.

Example 43

In Example 43, the nonaqueous electrolyte battery of Example 43 was manufactured using the following materials.

As the negative electrode active material, the battery active material synthesized in Example 1 was used. As the positive electrode active material, lithium iron phosphate ($LiFePO_4$) was used. As the nonaqueous electrolyte, a liquid electrolyte prepared by dissolving $LiBF_4$ in a PC/GBL (1:2) mixed solvent at a concentration of 1.5 M was used. As the container member, laminate film was used.

The manufactured nonaqueous electrolyte battery of Example 43 was a laminate battery having dimensions of thickness 3.6 mm×width 72 mm×height 100 mm, and a capacity of 2 Ah. The battery voltage of the battery of Example 43 was 1.85 V. As such, it was found that the battery voltage of the nonaqueous electrolyte battery of Example 43 would be a voltage compatible with a lead battery when six are connected in series.

Comparative Example 41

In Comparative Example 41, the nonaqueous electrolyte battery of Comparative Example 41 was manufactured using the following materials.

As the negative electrode active material, graphite was used. As the positive electrode active material, lithium iron phosphate ($LiFePO_4$) was used. As the nonaqueous electrolyte, a liquid electrolyte prepared by dissolving $LiBF_4$ in a PC/GBL (1:2) mixed solvent at a concentration of 1.5 M was used. As the container member, laminate film was used.

The manufactured nonaqueous electrolyte battery of Comparative Example 41 was a laminate battery having dimensions of thickness 3.6 mm×width 72 mm×height 100 mm, and a capacity of 2 Ah. The battery voltage of the battery of Comparative Example 41 was 3.4 V.

Comparative Example 42

In Comparative Example 42, the nonaqueous electrolyte battery of Comparative Example 42 was manufactured using the following materials.

As the negative electrode active material, the battery active material synthesized in Comparative Example 1 was used. As the positive electrode active material, a lithium manganese composite oxide ($Li_{1.1}Mn_{1.9}Al_{0.1}O_4$) was used. As the nonaqueous electrolyte, a liquid electrolyte prepared by dissolving $LiBF_4$ in a PC/GBL (1:2) mixed solvent at a concentration of 1.5 M was used. As the container member, laminate film was used.

The manufactured nonaqueous electrolyte battery of Comparative Example 42 was a laminate battery having dimensions of thickness 4 mm×width 72 mm×height 100 mm, and a capacity of 2 Ah. The battery voltage of the battery of Comparative Example 42 was 2.85 V. As such, it was found that the battery voltage of the nonaqueous electrolyte battery of Comparative Example 42 would be a voltage compatible with a lead battery when five are connected in series.

[Evaluation]

The nonaqueous electrolyte batteries of Examples 41 to 43 and Comparative Examples 41 and 42 were subjected to a charging and discharging cycle test with rates of 1 C charging/1 C discharging under an 80° C. environment, and the cycle capacity retention rate (%) after 500 cycles was measured. Results are shown in Table 4.

In addition, Example 41 and Comparative Example 42 were subjected to a discharge rate test with rates of 1 C charging/1 C discharging under a 25° C. environment, and the rate performance (the ratio (%) of the 10 C discharge capacity to the 1 C discharge capacity) was evaluated. Results are shown in Table 4.

TABLE 4

|  | Capacity Retention Rate (%) | Rate Performance (%) |
| --- | --- | --- |
| Example 41 | 82 | 88 |
| Example 42 | 90 | — |
| Example 43 | 96 | — |
| Comparative Example 41 | below 5 | — |
| Comparative Example 42 | 60 | 74 |

The batteries of Examples 41 to 43, where the battery active material of the present invention was used for the negative electrode, showed a high capacity retention rate and were found to have excellent high temperature durability. In particular, an exceptionally favorable result was obtained for Example 43, where lithium iron phosphate ($LiFePO_4$) was used as the positive electrode active material, and a 1.5 M $LiBF_4$-PC/GBL (1:2) liquid electrolyte was used. On the other hand, for Comparative Example 41, where graphite was used as the negative electrode active material, the capacity rapidly decreased within few cycles after ten, and the capacity after 500 cycles was almost zero. In addition, the battery of Example 41, which used the negative electrode active material of the present invention which includes a mixed phase of a titanium-including composite oxide phase and a titanium oxide phase, was found to have higher rate performance than the battery of Comparative Example 42, where a negative electrode active material not including titanium oxide (not a mixed phase) was used.

The battery active material according to at least one embodiment and example includes a mixed phase of a phase of titanium oxide and a phase of titanium-including composite oxide having a crystal structure belonging to the space group Cmca or space group Fmmm. As a result, the battery active material according to the first embodiment can realize a nonaqueous electrolyte battery which can exhibit excellent input and output characteristics and life characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material particle which comprises a mixed phase of a phase of titanium oxide and a phase of titanium-including composite oxide having a crystal structure belonging to a space group Cmca or a space group Fmmm.

2. The active material particle of claim 1, wherein a diffraction pattern of the active material particle obtained by wide-angle X-ray diffraction comprises a main peak A of the phase of titanium-including composite oxide, and a main peak B of the phase of titanium oxide, and a ratio Z (=Y/X) of an intensity Y of the main peak B to an intensity X of the main peak A is from 0.01 to 1.3.

3. The active material particle of claim 1, wherein the titanium-including composite oxide has a crystal structure belonging to a space group Cmca, and the titanium-including composite oxide is represented by a general formula $Li_{(2+x)}MTi_6O_{14}$, wherein M is at least one selected from Sr and Ba, and x is within a range of $0 \leq x \leq 6$.

4. The active material particle of claim 1, wherein the titanium-including composite oxide has a crystal structure belonging to a space group Fmmm, and the titanium-including composite oxide is represented by a general formula $Li_{(2+y)}Na_2Ti_6O_{14}$, wherein y is within a range of $0 \leq y \leq 6$.

5. The active material particle of claim 1, wherein the titanium oxide has an anatase type structure.

6. The active material particle of claim 1, further comprising a carbon-including layer formed on at least a portion of a surface of the active material particle.

7. The active material particle of claim 1, which is a battery active material.

8. A nonaqueous electrolyte battery comprising:
a positive electrode;
a negative electrode comprising a negative electrode active material, the negative electrode active material comprising the active material particle of claim 1; and
a nonaqueous electrolyte.

9. The nonaqueous electrolyte battery of claim 8, wherein the positive electrode comprises a positive electrode active material, and the positive electrode active material comprises an iron-including phosphorus oxide having an olivine structure.

10. The nonaqueous electrolyte battery of claim 8, wherein the positive electrode comprises a positive electrode active material, and the positive electrode active material comprises at least one selected from the group consisting of a lithium manganese composite oxide having a spinel structure, and a lithium nickel manganese cobalt composite oxide having a layered structure.

11. A battery pack comprising the nonaqueous electrolyte battery of claim 8.

12. The battery pack of claim 11, further comprising a protective circuit and an energizing terminal.

13. The battery pack of claim 11, comprising plural of the nonaqueous electrolyte batteries, the nonaqueous electrolyte batteries being electrically connected in series, in parallel, or in combination of in series and in parallel.

* * * * *